(12) United States Patent
Dion et al.

(10) Patent No.: US 7,200,305 B2
(45) Date of Patent: Apr. 3, 2007

(54) ELECTRO-OPTICAL CABLE FOR USE IN TRANSMISSION OF HIGH VOLTAGE AND OPTICAL SIGNALS UNDER EXTREMES OF TEMPERATURE

(75) Inventors: John Dion, Pepperell, MA (US); Mark A. Carlson, Amherst, NH (US)

(73) Assignee: BAE Systems Information And Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 10/535,565

(22) PCT Filed: Nov. 20, 2003

(86) PCT No.: PCT/US03/37435

§ 371 (c)(1),
(2), (4) Date: May 19, 2005

(87) PCT Pub. No.: WO2004/049030

PCT Pub. Date: Jun. 10, 2004

(65) Prior Publication Data

US 2006/0056783 A1    Mar. 16, 2006

Related U.S. Application Data

(60) Provisional application No. 60/428,156, filed on Nov. 21, 2002.

(51) Int. Cl.
G02B 6/44 (2006.01)
H01B 11/22 (2006.01)
(52) U.S. Cl. .................................................. 385/101
(58) Field of Classification Search ........ 385/100–114, 385/123, 128
See application file for complete search history.

(56) References Cited

U.S. PATENT DOCUMENTS

| 5,002,359 A * | 3/1991 | Sayegh ............... 385/107 |
| 5,042,903 A | 8/1991 | Jakubowski |
| 5,468,913 A | 11/1995 | Seaman et al. |
| 6,343,172 B1 | 1/2002 | Schiestle et al. |
| 6,600,108 B1 * | 7/2003 | Mydur et al. ........... 174/120 R |

* cited by examiner

Primary Examiner—Sarah Song
(74) Attorney, Agent, or Firm—Daniel J. Long

(57) ABSTRACT

An electro-optical cable (38) which includes an optical element (48) having an elongated glass fiber core (50), a medial cushioning layer (54) concentrically surrounding the glass fiber core, and an outer hard shell (56) material surrounding the medial cushioning layer. The cable also includes at least one electrically conductive element (40) comprising an elongated conductive core (42) and a dielectric layer (44) concentrically surrounding the electrically conductive element.

5 Claims, 1 Drawing Sheet

ELECTRO-OPTICAL CABLE FOR USE IN TRANSMISSION OF HIGH VOLTAGE AND OPTICAL SIGNALS UNDER EXTREMES OF TEMPERATURE

STATEMENT OF GOVERNMENT INTEREST

The invention described herein was made under Contract No. N0019-96-C005 with the Government of the United States of America and may be manufactured and used by and for the Government of the United States of America for Governmental purposes without the payment of any royalties thereon or therefor.

CROSS REFERENCE TO RELATED APPLICATIONS

This application claims rights under 35USC119(e) from U.S. Application Ser. No. 60/428,156, filed Nov. 21, 2002.

BACKGROUND OF THE INVENTION

1. Field of the Invention

The present invention relates to towed decoys for use in aviation, and more particularly to electro-optical cables for use in such towed decoys.

2. Brief Description of Prior Developments

It is known in the art to provide a decoy which is towed on an electro-optical cable from a combat aircraft. U.S. Pat. No. 5,042,903 for example, discloses a relatively small diameter tow cable including a plurality of high and low voltage electrical conductors and a high bandwidth optical fiber for both electrical and data transmission between an aircraft and a towed body. The tow cable is implemented by a coaxial arrangement of a central optical fiber encased by a stainless steel jacket surrounded by a first set of high voltage conductors. A second set of high voltage conductors concentrically surrounds the first set of conductors but is separated therefrom by a layer of high voltage insulation. A layer of high voltage insulation surrounds the second set of high voltage conductors and a set of relatively low voltage conductors and their respective return conductors are circumferentially spaced around this layer of insulation along with opposing sets of insulating spacers. A third layer of insulating material surrounds the low voltage conductors and the spacers. Outwardly of the third layer of insulating material are a pair of coaxial strength members comprised of synthetic aramid fibers and which are then covered with a polyester and metallic braid. An outermost jacket of semi-conductive material is also provided which serves as an electrostatic drain to ground for the cable.

The prior are also discloses other electro-optical cables used for other purposes.

U.S. Pat. No. 5,468,913, for example, discloses a marine tow cable having both coaxial electronic and fiber optic data transmission capabilities wherein the coaxial core conductors are positioned at the neutral axis or center line of the cable with the coaxial shield conductor circumscribing a dielectric material therebetween. Embedded within the dielectric material matrix, separating the core conductors and the shield conductor, are fiber optic transmitters helically circumscribing the core conductors. Surrounding the electro-optical assembly is a watertight jacket and a protective armor cover to carry the tensile forces imparted to the cable during towing operations.

U.S. Pat. No. 6,343,172 discloses composite cables which are operative to transmit information in electrical and/or optical transmission modes. The cables can include an electrical coaxial conductor comprising a generally central electrical conductor in a dielectric matrix. At least one optical transmission component is integrated with the matrix. The matrix can include at least two optical transmission components disposed on generally opposed sides of the central electrical conductor.

While such arrangements have generally performed well, there is a need to still further improve the temperature, mechanical, electrical and environmental durability of such electro-optical cables.

SUMMARY OF INVENTION

The present invention is an electro-optical signal cable which has improved the temperature, mechanical, electrical, and environmental durability. Volumetric and weight impacts are minimized, thus significantly extending applicability beyond current existing design limitations. This electro-optical cable is comprised of an optical element which includes an elongated glass fiber core, a medial cushioning layer concentrically surrounding the glass fiber core, and an outer hard shell material surrounding the medial cushioning layer. This electron-optical cable also includes at least one electrically conductive element comprising an elongated conductive core and a dielectric layer concentrically surrounding the electrically conductive core.

BRIEF DESCRIPTION OF THE DRAWINGS

The present invention is further described with reference to the accompanying drawings, wherein.

DETAILED DESCRIPTION OF THE PREFERRED EMBODIMENT

Improved durability has been achieved by acknowledging the three distinct elements of the cable and addressing each separately then merging the elements into a single design. The constituent layers are combined in a synergistic manner. The electrical conductors make use of adhesive materials in order to fuse the dielectric materials to the wire. The resulting wire construction method demonstrates excellent dielectric withholding potential, over 5 kV, at temperatures of up to 700° F. The fiber optic element has been improved through consideration of the optical fiber as a portion of a composite beam, in which the fiber was encased in a cushion of polytetrafluorethylene (PTFE, Teflon), then a thermoplastic resin, polyetheretherketone (PEEK), was utilized to provide a tough, hard, outer shell which improved both thermal and mechanical durability to levels in excess of 700° F. The electrical conductors may have layers of dielectric PTFE and aromatic co-polyimides such as poly(p-phenylene bihenyltetracarboximide) (BPDA-PDA) and pyromellitimiooxydianilinecarboximide (PMDA-ODA). The conductors are preferably copper with a plating of a diffusion barrier such as nickel. The braid selected consisted of a poly(p-phenylene-2,6-benzobisoxazole) (PBO, Zylon), with a friction reducing coating included to aid in deployment of the material. The resulting cable system has proven performance when subjected to the rigors of the after-burning plume of a jet engine installed in the U.S. Navy's F/A-18E/F aircraft. It is believed that enhanced thermal and mechanical performance may also be obtained through the use of advanced polymers such as poly(p-phenylene bihenyltetra-carboximide (BPDA-PDA, Upilex-S) and other co-polymers based on aromatic polyimides such as PMDA-ODA and films made of poly(p-phenylene-2,6-benzobisoxazole (PBO, Zylon)).

Figure 1:
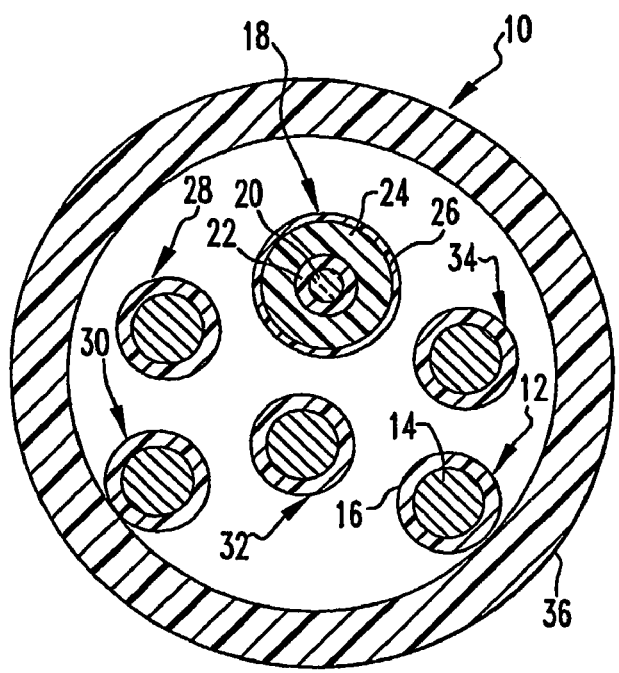
FIG. 1 is a vertical cross sectional view of a preferred embodiment of the electro-optical cable of the present invention.

Referring to FIG. 1, cable 10 includes an electrical conductive element 12 which is comprised of a metallic core 14 which is preferably 32 gage copper wire. The metallic core 14 is peripherally surrounded by a dielectric element 16 which is preferably 0.002"/0.003" MIL-ENE. The cable 10 also includes an optical conductive element 18. This optical conductive element 18 is comprised of a glass core 20 which is peripherally overlaid by an arcylate section 22 which is preferably 245 microns in thickness. A PTFE layer 24 which is preferably 0.003" in thickness peripherally overlays the arcylate section 22. A FEP section 26 peripherally overlays the PTFE section 24. The FEP section 26 preferably has an outside diameter of 600 microns. The cable 10 also includes a plurality of additional electrical conductive elements as at electrical conductive elements 28, 30, 32, and 34 which are essentially identical to electrical conductive element 12. Cable 10 also includes an outer peripheral jacket 36 which is comprised of Zylon.

Figure 2:
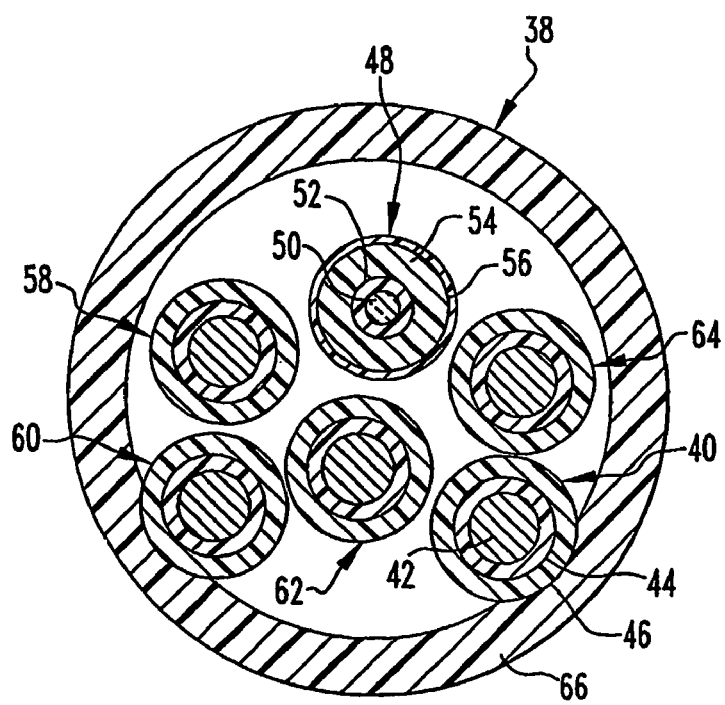
FIG. 2 is a vertical cross sectional view of an alternate preferred embodiment of the electro-optical cable of the present invention.

Referring to FIG. 2, in another embodiment of this invention cable 38 includes an electrical conductive element 40. This electrical conductive element 40 is comprised of a metallic core 42 which is peripherally surrounded by a PTFE layer 44 which is preferably 0.005" in thickness. A EKJ layer 46 peripherally overlays the PTFE layer 42 an is preferably from 0.003" to 0.006" in thickness. The cable 38 also includes an optical conductive element 48 which has glass core 50 which is peripherally overlaid by a polyimide section 52 which is preferably 152 microns in thickness which is itself peripherally overlaid by a PTFE layer 54 which is preferably 0.003" in thickness. The PTFE layer 54 is peripherally overlaid by a PFA and PEEK composite layer 56 which has a 600 micron outer diameter. In the PFA and PEEK composite layer 56 there is an inner layer of the softer PFA which is overlaid by a shell of the harder PEEK. The stiff PEEK shell provides crushing protection during winding, storage and deployment of the cable. The softer PFA and the softer PTFE layer 54 allow the fragile glass core 50 to more or less float within the PEEK shell so as to absorb energy during deployment and reduce thermal shock during exhaust plume exposure. This combination of PEEK, PFA and PTFE also protects the glass core 50 from water. The cable 38 also includes additional electrical conductive elements 60, 62, 64 which are essentially identical to electrical conductive element 40. Cable 10 also includes an outer peripherally jacket 66 which is comprised of Zylon.

It will be appreciated that an electro-optical cable has been described which is durable under adverse temperature, mechanical, electrical and other environmental conditions.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An electro-optical cable comprising:
   an optical element comprising an elongated glass fiber core, a polytetrafluorethylene medial cushioning layer wherein said optical element has a layer selected from an acylate and a polyimide interposed between the glass core and the cushioning layer concentrically surrounding the glass fiber core, and an outer hard polyetherketone layer surrounding the medial cushioning layer; and
   at least one copper electrically conductive element comprising an elongated conductive core and a dielectric polytetrafluorethylene layer concentrically surrounding the electrically conductive core wherein said electrically conductive element has a layer of an aromatic co-polyimide concentrically surrounding the dielecetric layer.

2. The electro-optical cable of claim 1 wherein there are a plurality of electrically conductive elements.

3. The electro-optical cable of claim 1 which has an outer peripheral protective jacket.

4. The electro-optical cable of claim 1 which is used to connect a towed decoy to an aircraft.

5. The electro-optical cable of claim 4 which is capable of sustained exposure to an after-burner plume of a jet engine.

* * * * *